United States Patent
Sakai

(10) Patent No.: US 8,985,781 B2
(45) Date of Patent: Mar. 24, 2015

(54) PROJECTOR CONTROL DEVICE AND COMPUTER-READABLE RECORDING MEDIUM

(71) Applicant: Casio Computer Co., Ltd., Tokyo (JP)

(72) Inventor: Mitsuo Sakai, Hamura (JP)

(73) Assignee: Casio Computer Co., Ltd., Tokyo (JP)

( * ) Notice: Subject to any disclaimer, the term of this patent is extended or adjusted under 35 U.S.C. 154(b) by 340 days.

(21) Appl. No.: 13/627,152

(22) Filed: Sep. 26, 2012

(65) Prior Publication Data
US 2013/0077060 A1 Mar. 28, 2013

(30) Foreign Application Priority Data
Sep. 28, 2011 (JP) ................. 2011-213051

(51) Int. Cl.
*G03B 21/14* (2006.01)
*G03B 21/26* (2006.01)
*H04N 9/31* (2006.01)

(52) U.S. Cl.
CPC .............. *G03B 21/26* (2013.01); *H04N 9/3185* (2013.01); *H04N 9/3194* (2013.01)
USPC .................................. 353/69; 353/70; 353/30

(58) Field of Classification Search
USPC ........................ 353/30, 69, 70, 42, 29, 21, 44; 715/719–722; 345/1.3
See application file for complete search history.

(56) References Cited

U.S. PATENT DOCUMENTS

| 7,762,671 | B2 * | 7/2010 | Saito | 353/42 |
| 8,480,237 | B2 * | 7/2013 | Tamura | 353/70 |
| 8,587,731 | B2 * | 11/2013 | Takahashi | 348/745 |
| 2013/0021585 | A1 * | 1/2013 | Tamura | 353/69 |

FOREIGN PATENT DOCUMENTS

| JP | 2003-283963 A | 10/2003 |
| JP | 2011-097629 A | 5/2011 |

\* cited by examiner

*Primary Examiner* — William C Dowling
(74) *Attorney, Agent, or Firm* — Holtz, Holtz, Goodman & Chick PC

(57) ABSTRACT

A corrector corrects a main image acquired by an image acquirer based on correction setting acquired by a correction setting acquirer, and stores corrected main image in a buffer. An unused area detector detects the area that has not stored the corrected main image in the buffer, and transmits the result to a sub-image selector. The sub-image selector selects, among sub-image candidates registered in a sub-image information memory, a candidate that can be displayed on the unused area and has the highest priority as a sub-image. The sub-image controller executes a program stored in the sub-image displaying program memory, and displays the selected sub-image on the unused area.

10 Claims, 12 Drawing Sheets

FIG. 3

SUB-IMAGE INFORMATION

| SUB-IMAGE ID | CONTENT | EXECUTION PROGRAM | REQUIRED MINIMUM HEIGHT | REQUIRED MINIMUM WIDTH | PRIORITY |
|---|---|---|---|---|---|
| 1 | RGB DISPLAY | #01 | 10 | 10 | 1 |
| 2 | PRESENT TIME | #02 | 20 | 40 | 2 |
| 3 | INPUT DISPLAY | #03 | 20 | 20 | 3 |
| 4 | PREVIOUS DISPLAY IMAGE | #04 | 30 | 30 | 4 |
| ... | ... | | ... | ... | ... |

FIG. 10

SUB-IMAGE INFORMATION

| SUB-IMAGE ID | CONTENT | EXECUTION PROGRAM | REQUIRED MINIMUM HEIGHT | REQUIRED MINIMUM WIDTH | PRIORITY | ... |
|---|---|---|---|---|---|---|
| 1 | RGB DISPLAY | #01 | 10 | 10 | 3 | ... |
| 2 | PRESENT TIME | #02 | 20 | 40 | 4 | ... |
| 3 | INPUT DISPLAY | #03 | 20 | 20 | 5 | ... |
| 4 | PREVIOUS DISPLAY IMAGE | #04 | 30 | 30 | 6 | ... |
| 5 | PC DESIGNATING SCREEN | #05 | 50 | 50 | 1 | ... |
| 6 | BRIGHTNESS SETTING SCREEN | #06 | 40 | 40 | 2 | ... |
| ... | ... | ... | ... | ... | ... | ... |

PROJECTOR CONTROL DEVICE AND COMPUTER-READABLE RECORDING MEDIUM

CROSS-REFERENCE TO RELATED APPLICATION

This application claims the benefit of Japanese Patent Application No. 2011-213051, filed Sep. 28, 2011, the entire disclosure of which is incorporated by reference herein.

FIELD

This application relates to a projector control device and a computer-readable recording medium.

BACKGROUND

A projector for projecting an image acquired from a PC or the like onto a screen is known. When projecting an image on a screen using a projector, a projected image may be distorted into a trapezoid on a screen depending on a projection angle.

In order to cancel such keystone distortion, Patent Literature 1 (Unexamined Japanese Patent Application Kokai Publication No. 2011-97629) and Patent Literature 2 (Unexamined Japanese Patent Application Kokai Publication No. 2003-283963) disclose a technique that projects an image without distortion on a screen by correcting the image in advance.

According to the technique described in Patent Literature 1 or Patent Literature 2, when executing the keystone correction, some areas on which an image can be originally displayed is blacked out. Accordingly, there is an area on which any image is not displayed at all even if an image can be displayed on the area. Thus, there is a problem that area onto which a projector can project an image is wasted.

The present invention is made in view of the above circumstances, and an object is to provide a projector control device and a computer-readable recording medium capable of effectively utilizing a displayable area at the time of performing a keystone correction and displaying a screen.

SUMMARY

According to the present invention, there is provided a projector control device comprising:

a projection controller that performs a keystone correction on a main image that is a major image projected and displayed on a projection plane, and causes a projection device to project a corrected main image;

a detector that detects an unused area to which the projection device project an image and that is an area not displaying the main image applied the keystone correction; and a sub-image acquirer that acquires a sub-image to be displayed on at least a part of the unused area detected by the detector, wherein the projection controller controls the projection device to project the sub-image to at least the part of the unused area.

According to the present invention, it is possible to provide a projector control device and a program capable of effectively utilizing a displayable area at the time of performing a keystone correction and displaying a screen.

BRIEF DESCRIPTION OF THE DRAWINGS

A more complete understanding of this application can be obtained when the following detailed description is considered in conjunction with the following drawings, in which:

FIG. 3 is a drawing illustrating an example of a sub-image information according to embodiment 1;

FIG. 10 is a drawing illustrating an example of sub-image information according to embodiment 2;

DETAILED DESCRIPTION

Hereinafter, an image projection system according to embodiments for carrying out the present invention will be described referring to drawings. Note that, the identical symbols are given to identical or corresponding parts.

Embodiment 1

Figure 1A:
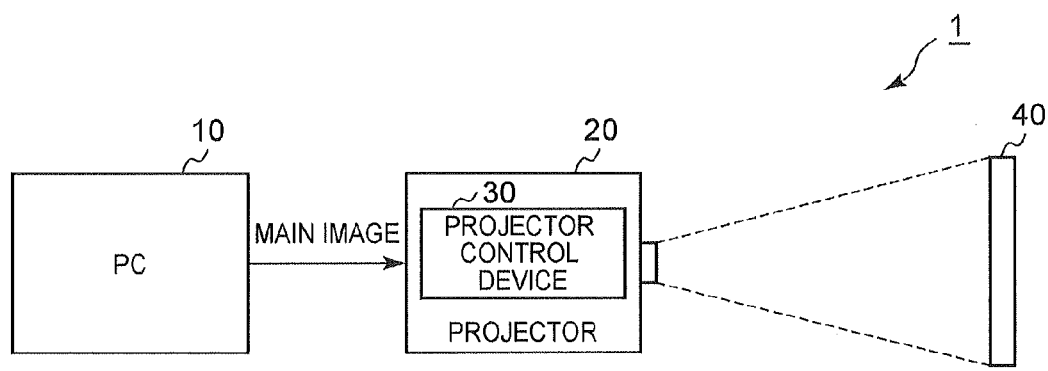
FIG. 1A is a block diagram illustrating a constitution of an image projection system according to embodiment 1 of the present invention.

An image projection system 1 according to the embodiment 1 of this application will be described with reference to FIG. 1. The image projection system 1 is provided with a computer (PC 10), a projector 20 including a projector control device 30, and a screen 40, as illustrated in FIG. 1A.

The PC 10 is a computer that outputs images to be projected onto the screen 40 to the projector 20 one by one. The PC 10 includes an image output terminal, such as an analog RGB terminal and an HDMI (High-Definition Multimedia Interface) terminal, and has a function of outputting the image to outside using communicative functions, such as a LAN (Local Area Network) interface.

The projector 20 is an image projection apparatus for outputting the image (main image) output by the PC 10 as light, and projecting onto the screen 40. The projector 20 is provided with a keystone correction function that corrects a keystone distortion of the image projected on the screen 40. The projector 20 performs the keystone correction on the image that the PC 10 outputs by executing the process described later by the internal projector control device 30, and further, adds a sub-image by a process described later to project it on the screen 40.

The screen 40 is a curtain that functions as a projection plane for receiving the light projected by the projector 20 and forming an image.

Figure 1B:
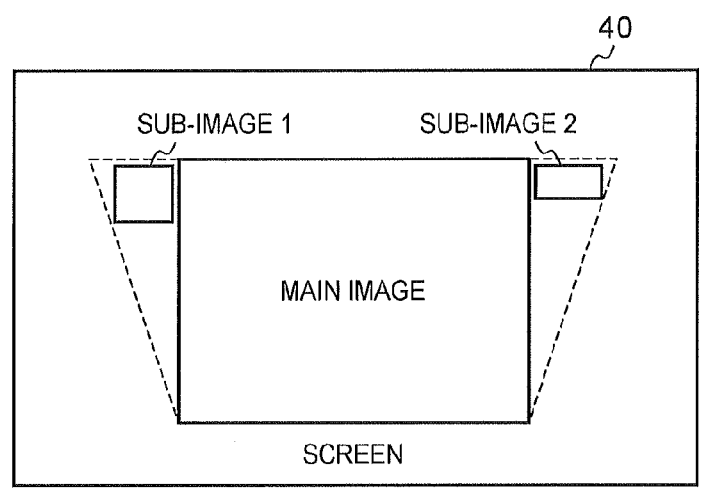
FIG. 1B is a drawing illustrating an example of a screen projected by the image projection system according to embodiment 1 of the present invention.

An example of the screen projected on the screen 40 will be described with reference to FIG. 1B. In FIG. 1B, the projector 20 projects the screen from a lower side to the plane formed by the screen 40. In FIG. 1B, since the projector 20 performs the keystone correction on the main image in a perpendicular direction to project the image, an area (unused area, part illustrated by dotted lines) is present, which can be displayed on the right and left of the main image but does not form the main image. Hereinafter, in order to facilitate the understanding, a case where the keystone correction is performed only in the perpendicular direction will be described.

A sub-image 1 and a sub-image 2 are presented on a part of the unused area.

The image displayed as the sub-image is a screen, for example, displayed overlapping on the main screen in a conventional projector, such as a screen that displays a name of an input terminal used for the main image currently displayed, a screen that displays the current time, and a screen that displays a current property of the projector.

Figure 2:
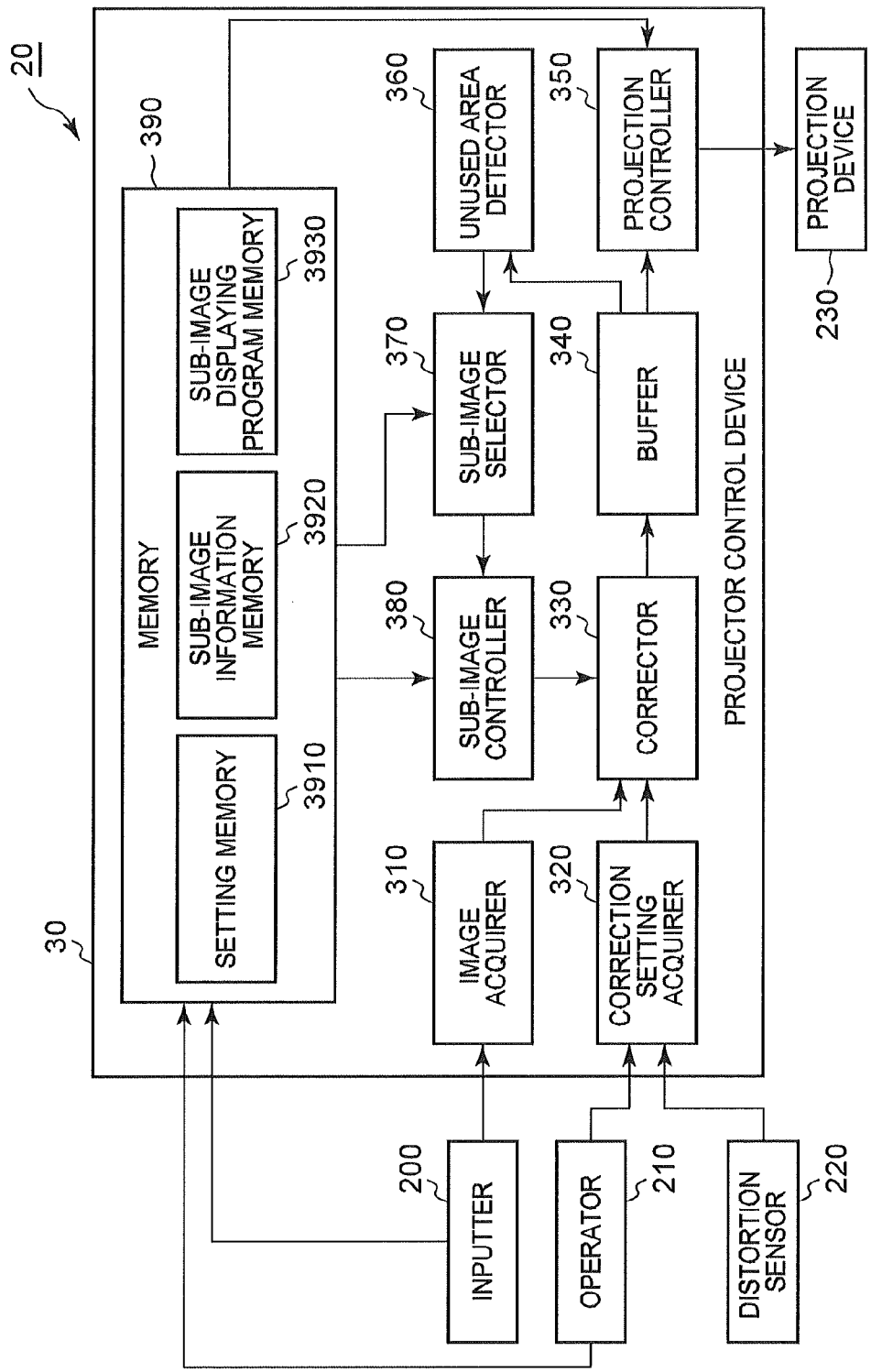
FIG. 2 is a block diagram illustrating constitutions of a projector and a projector control device according to embodiment 1.

Next, a constitution of the projector 20 will be described with reference to FIG. 2. The projector 20 includes an inputter 200, an operator 210, a distortion sensor 220, a projection device 230, and a projector control device 30.

The inputter 200 is provided with an image input terminal, such as an analog RGB terminal, an S terminal, and an HDMI (High-Definition Multimedia Interface) terminal, and an input controller. The inputter 200 receives the images (main images) in order output by the PC 10.

The inputter 200 transmits the received images to the projector control device 30 in order. The inputter 200 may be an information receiver that is provided with a LAN (Local Area Network) interface, a USB (Universal Serial Bus) interface or the like. In this case, the inputter 200 receives the image as information that the PC 10 outputs, extracts the image from the received information to transmits the image to the projector control device 30.

The operator 210 is provided with a receiver or the like that receives operation information from various buttons or a remote controller, and functions as a user interface that receives an operation of the user to the projector 20. The operator 210 includes a distortion correction operation receiver that receives the operation of the user for manually setting a parameter for the distortion correction, and a setting operation receiver that receives the operation of the user for updating the operation setting of the projector.

The operator 210 transmits the information regarding the received operation of the user to the projector control device 30.

The distortion sensor 220 is provided with an accelerometer, measures an angle of the projector, and transmits the measured angle to the projector control device 30 as distortion information.

The projection device 230 is an apparatus that is provided with a DMD (Digital Micromirror Device), a DMD controller, a lens, a lens drive motor, a light source and so on, and that serves a projection function of the projector. The projection device 230 projects the image stored in the buffer 340 of the projector control device 30 under a control of the projector control device 30. The projection device 230 can project the image up to M×N pixels.

The projector control device 30 is a control device that acquires the image information output by the PC 10 from the inputter 200, converts the acquired image (main image) based on the information transmitted from the operator 210, the inputter 200 and the distortion sensor 220, and the setting information stored in advance, adds the sub-image to the result and causes the projection device 230 to project the image.

The projector control device 30 is provided with, from a functional standpoint, an image acquirer 310, a correction setting acquirer 320, a corrector 330, a buffer 340, a projection controller 350, an unused area detector 360, a sub-image selector 370, a sub-image controller 380, and a memory 390. The physical constitution of the projector control device 30 is described later.

The image acquirer 310 acquires the images from the inputter 200 in order, and transmits the acquired images to the corrector 330 in order. The image acquirer 310 transmits a default screen stored in the memory 390 to the corrector 330, in cases where the image that the PC 10 outputs cannot be acquired from the inputter 200.

The correction setting acquirer 320 determines a distortion correction parameter based the information on the distortion correction operation received by the distortion correction operation receiver of the operator 210, and the distortion information transmitted from the distortion sensor 220. As a method for determining the parameter for the distortion correction from the distortion information transmitted by the distortion sensor 220 (for example, angle information of the projector) and the user's operation, arbitrary known means may be employed. For example, means described in Patent Literature 2 can be used.

The corrector 330 performs the keystone correction on the image transmitted from the image acquirer 310 and the sub-image controller 380 using the correction parameter that is determined by the correction setting acquirer 320. The corrector 330 stores the corrected image in the buffer 340. Means of the keystone correction may be arbitrary known means. For example, means described in Patent Literature 1 or means described in Patent Literature 2 can be used.

The buffer 340 is storage device that temporarily stores the image to be projected by the projection device 230, and is provided with M×N pieces of storage areas that store the pixel values corresponding to pixels respectively that the projection device 230 can project.

The buffer 340 stores the image corrected by the corrector 330. Furthermore, the stored image is transmitted to the projection controller 350 in accordance with an instruction of the projection controller 350, and is transmitted to the unused area detector 360 in accordance with an instruction of the unused area detector 360, respectively.

The projection controller 350 is a control device that causes the projection device 230 to project the image stored in the buffer 340. The projection controller 350 blacks out the areas corresponding to the storage areas in the buffer 340 where the pixel values are not stored (sets the pixel values to indicate black), and causes the projection device 230 to project it. The projection controller 350 controls the projection device 230 based on projection setting stored in a setting memory 3910 of the memory 390.

The unused area detector 360 detects the storage areas where the pixel values are not stored among each M×N piece of storage area of the buffer 340. Specifically, the part (unused area), in which consecutive storage areas do not store the pixel values, is extracted within the buffer 340. In cases where the keystone correction is performed, the unused area includes a plurality of substantially triangle areas (FIG. 1B). With respect to each of the substantially triangle area that forms the unused area, the unused area detector 360 transmits coordinates of three vertices of each area to the sub-image selector 370.

The sub-image selector 370 selects the sub-image (an image different from the main image) to be displayed on the unused area, based on a shape and size of the unused area detected by the unused area detector 360.

That is, when the sub-image selector 370 receives the information (coordinates of vertices of the substantially triangle) that represents the unused area from the unused area detector 360, the sub-image selector 370 selects a sub-image that can be displayed on the unused area and has the highest priority, among the sub-images registered in the sub-image information memory 3920 of the memory 390. The concrete process executed by the sub-image selector 370 is described later.

The sub-image selector 370 transmits information regarding the selected sub-image to the sub-image controller 380.

The sub-image controller 380 reads an execution program corresponding to the sub-image selected by the sub-image selection unit 370, from the sub-image displaying program memory 3930, and executes the program to generate the sub-image.

The sub-image controller 380 transmits the generated sub-image to the corrector 330. At this time, the sub-image controller 380 also transmits the position, in which the corrected sub-image is to be arranged, to the corrector 330. When the corrector 330 stores the corrected sub-image in the buffer 340, the corrector 330 stores the sub-image in the position transmitted from the sub-image controller 380.

The memory 390 is provided with a RAM (Random Access Memory), a ROM (Read Only Memory) or the like, as physical components. The memory 390 stores information transmitted from each part except the inputter 200, the operator 210 and the memory 390 of the projector control device 30, and stores in advance a program and information for executing the following process by the projector control device 30. The memory 390 transmits the required information to each part based on the instructions from each part except the memory 390 of the projector control device 30.

The memory 390 includes the setting memory 3910, the sub-image information memory 3920, and the sub-image displaying program memory 3930.

The setting memory 3910 stores various kinds of setting information, such as the parameter used for projecting the image by the projection controller 350 using the projection device 230, the parameter for executing the correction by the corrector 330, and the maximum number for displaying the sub-images. The setting information is updated based on the information that represents that the setting is to be updated, the information being transmitted from the operator 210 and the inputter 200.

The sub-image information memory 3920 stores sub-image information in which candidates of the screen to be displayed as the sub-image are registered.

An example of the sub-image information stored in the sub-image information memory 3920 will be described with reference to FIG. 3.

The sub-image information constitutes a table that stores a sub-image ID, a content, an execution program, a required minimum height, a required minimum width, and a priority, associated with each other.

The sub-image ID in the sub-image information is an identifier that uniquely indicates a sub-image candidate.

The content in the sub-image information is information that represents the content displayed by the sub-image candidate.

The program in the sub-image information is information that represents a program stored in the sub-image displaying program memory 3930 for displaying the sub-image candidate.

The required minimum height and the required minimum width in the sub-image information are values each of which represents a required pixels of height and width for displaying the sub-image candidate.

The priority in the sub-image information is a value that represents a priority for displaying the sub-image candidate, and the lower value represents a higher priority for displaying the sub-image candidate. The sub-image information is stored in the sub-image information memory 3920 in advance at the time of factory shipments. The sub-image information may be defined based on a user's setting operation.

The sub-image displaying program memory 3930 stores programs for displaying each sub-image candidate registered in the sub-image information memory 3920, respectively.

The main image and the sub-image stored in the buffer 340, and the image projected on the screen 40 according to the above-described constitution will be described with reference to FIG. 4.

Figure 4A:
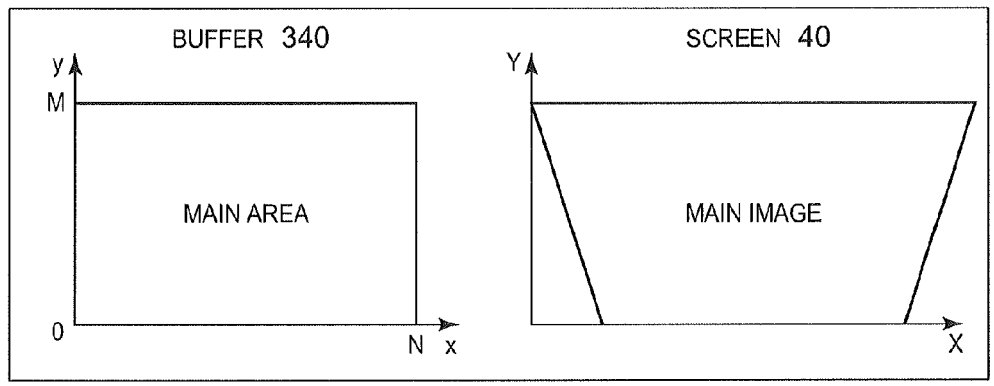
FIG. 4A is a drawing illustrating a buffer and a projection screen before a main image correction of the projector control device according to embodiment 1.

Before the keystone correction, all of the storage areas of N pieces in horizontal direction (a direction of x-axis of FIG. 4) and M pieces in vertical direction (a direction of y-axis) in the buffer 340 are areas for storing the main image (main areas). When the main image is projected onto the screen 40 by the projection device 230 in this state, the image is distorted to a trapezoid in which the upper side of the screen is longer than the lower side thereof (FIG. 4A).

Figure 4B:
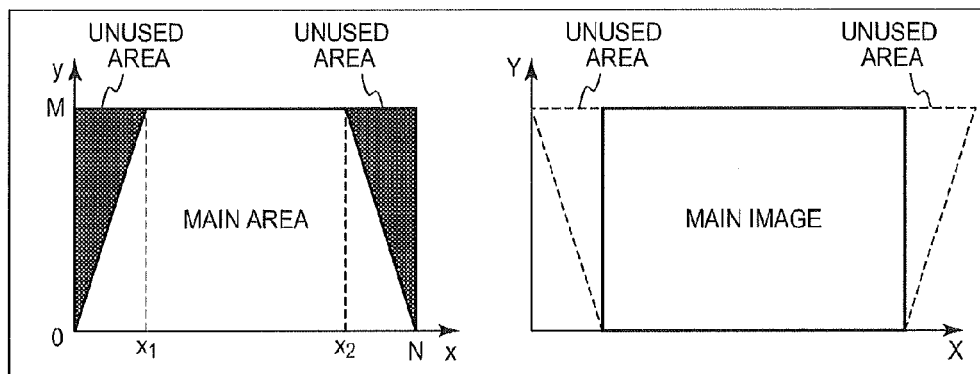
FIG. 4B is a drawing illustrating the buffer and the projection screen after the main image correction of the projector control device according to embodiment 1.

If the main image is corrected into a trapezoid on the buffer 340 and the unused area is displayed black, the keystone distortion will be solved on the screen 40 (FIG. 4B). This results in occurrence of area (the unused area) that is not displayed at all on the screen.

This unused area appears in the buffer 340, as a substantially triangle unused area (left side of the main area) that has three vertices of (x1, M), (0, M), and (0, 0), and a substantially triangle unused area (right side of the main area) that has three vertices of (x2, M), (N, M), and (N, 0).

Figure 4C:
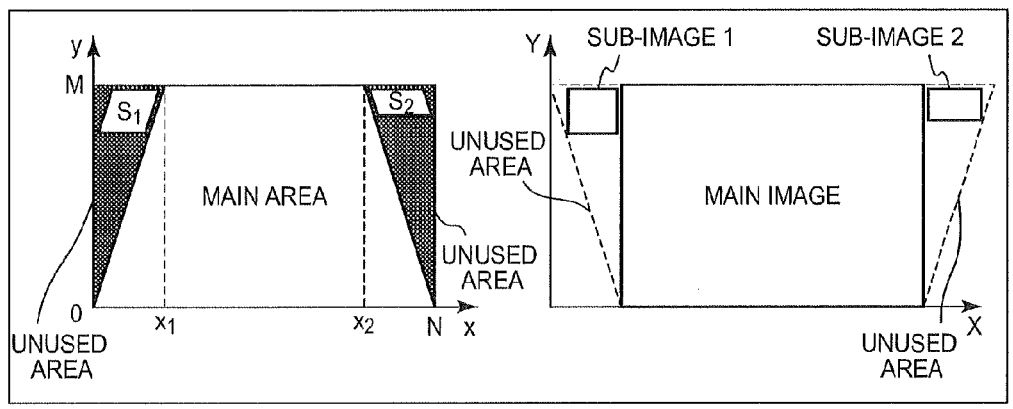
FIG. 4C is a drawing illustrating the buffer and the projection screen in an image display state of the projector control device according to embodiment 1.

The projector control device 30 of the present embodiment arranges the image generated by the sub-image controller 380, after correcting the image by the corrector 330, in the unused area of the buffer 340 (the sub area S1 and the sub area S2, left side in FIG. 4C). As a result, the sub-image is corrected and displayed beside the main image on the screen 40 (right side in FIG. 4C). Therefore, it is possible utilize a part of the unused area, which has not been used conventionally, as areas on which the sub-image 1 and the sub-image 2 are displayed.

Figure 6:
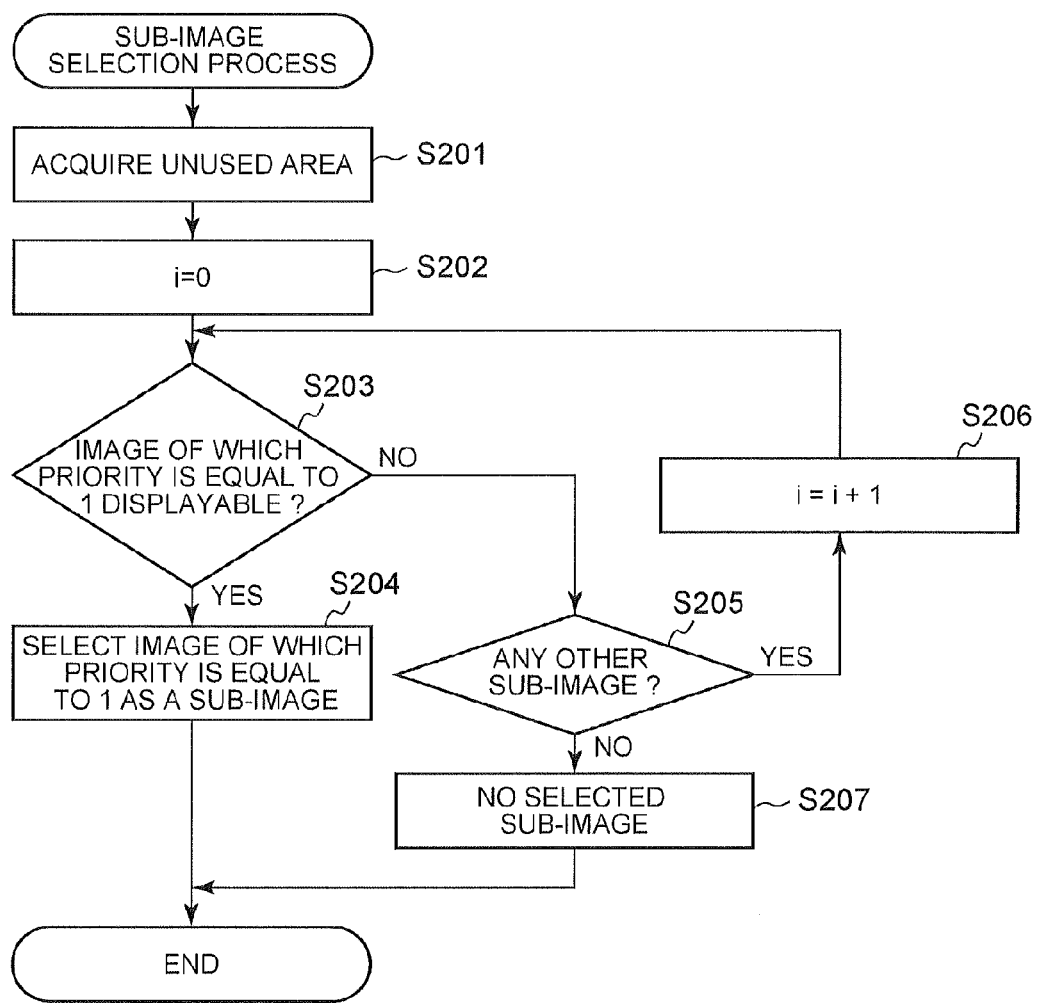
FIG. 6 is a flowchart of a sub-image selection process executed by the projector control device according to embodiment 1.
Figure 7:
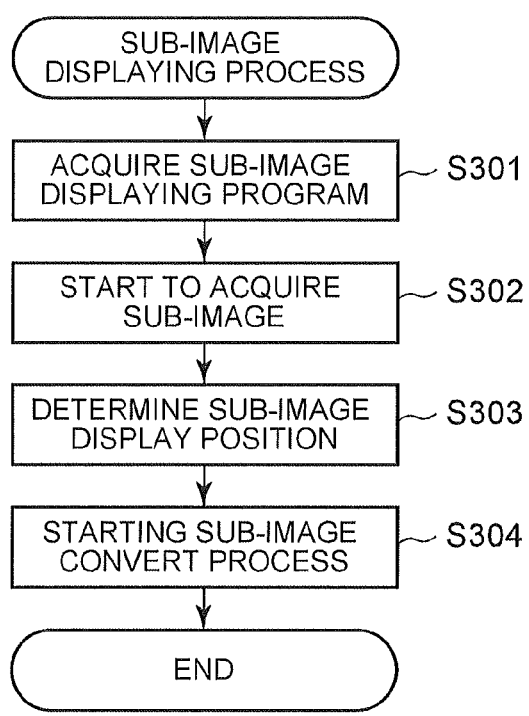
FIG. 7 is a flowchart of a sub-image displaying process executed by the projector control device according to embodiment 1.

The process executed by the projector control device 30 in order to display the sub-image as illustrated in FIG. 4 will be described with reference to FIG. 5 through FIG. 7.

Figure 5:
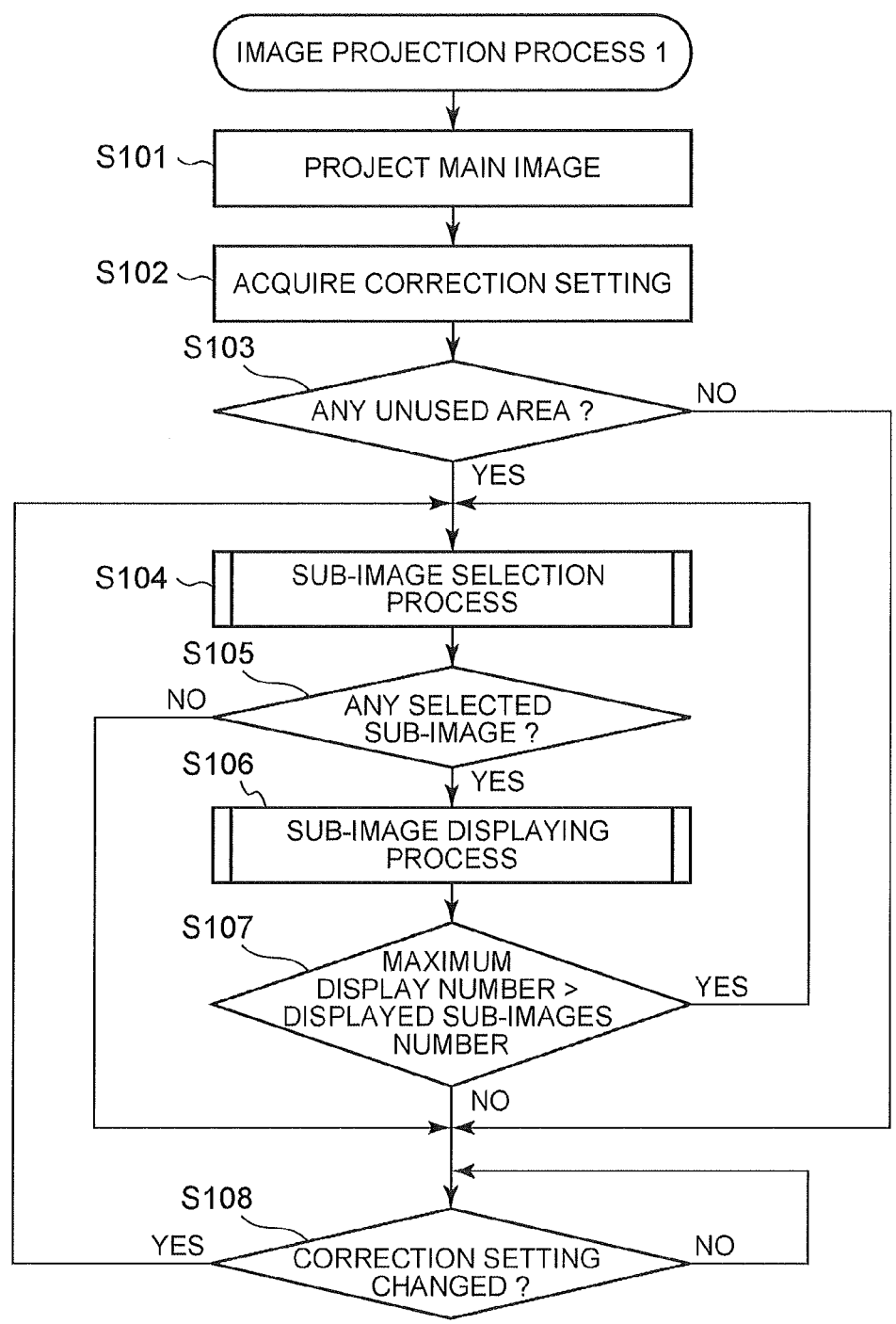
FIG. 5 is a flowchart of an image projection process executed by the projector control device according to embodiment 1.

The projector control device 30 starts an image projection process 1 illustrated in FIG. 5, when turning on the projector 20.

In the image projection process 1, first, the main image is projected on the screen 40 without correcting the main image. That is, the corrector 330 stores the image acquired by the image acquirer 310 in the buffer 340 without correcting the image, and the projection controller 350 causes the projection device 230 to project the image without any change (step S101). As illustrated in FIG. 4A, the main image distorted to the trapezoid may be displayed on the screen 40, depending on an angle between the screen 40 and the projector 20.

Next, the user validates the distortion correction setting, seeing the screen displayed in the step S101, and the correction setting acquirer 320 calculates the correction parameter based on the distortion information acquired by the distortion sensor 220 (step S102). In the step S102, a process is started in which the corrector 330 corrects the main image in order using the calculated parameter, and stores the result in the buffer 340. As a result, as illustrated in FIG. 4B, the main screen in which the keystone distortion is corrected is projected on the screen 40. In cases where a sufficient correction cannot be achieved with the information simply from the distortion sensor 220, the user operates the operator 210 and adjusts the correction parameter.

Next, the unused area detector 360 determines whether or not the correction has been performed and the unused area exists where the image has not stored on the buffer 340 (step S103). When it is determined that the unused area does not exist (step S103; NO), the process skips to step S108 that is described later.

On the other hand, when it is determined that the correction has been performed and the unused area exists in the buffer 340 (step S103; YES), the unused area detector 360 starts a sub-image selection process (step S104).

The sub-image selection process executed in the step S104 will be described with reference to FIG. 6. In the sub-image selection process, the unused area detector 360 first divides the unused area on the buffer 340 into substantially triangles, and acquires the values of the vertices of each substantially triangle (step S201). In the example of FIG. 4B, three points (x1, M), (0, M) and (0, 0) are acquired as the vertices of a left side unused area, and three points (x2, M), (N, M) and (N, 0) are acquired as the vertices of a left side unused area. In step S201, the unused area detector 360 further transmits the information of the acquired vertices to the sub-image selector 370.

When the information of the vertices of the unused areas is transmitted from the unused area detector 360, the sub-image selector 370 selects an image that is a sub-image capable of being displayed on the unused area, and that has the highest priority (the value of the priority is the smallest). For the selection, it first assigns a counter variable i to zero (step S202).

Next, the sub-image selector 370 acquires the information of the sub-image candidate, of which a priority is equal to i, from the sub-image information stored in the sub-image information memory 3920. Then, the three points of the unused area are compared with the required maximum height and the required minimum width of the acquired sub-image candidate, and it is determined whether the acquired sub-image can be displayed on the unused area (step S203). Specifically, if there is a substantially triangle that forms the unused area, has a height higher than the required maximum height, and has a width more than the required minimum width, it is determined that the sub-image candidate can be displayed. On the other hand, if there is not the substantially triangle that fulfills such conditions, it is determined that the sub-image candidate cannot be displayed. In the example of FIG. 4B, the height of a left unused area is M, the width thereof is x1, the height of a right unused area is M, and width thereof is N−x2.

When it is determined that the acquired sub-image candidate can be displayed (S203; YES), the sub-image selector 370 selects the sub-image candidate as the sub-image (step S204). Then, the sub-image selection process is ended.

On the other hand, when it is determined that the acquired sub-image candidate cannot be displayed (S203; NO), the sub-image selector 370 determines whether unprocessed sub-image candidate is registered in the sub-image information (step S205). When it is determined that there is the unprocessed sub-image candidate (step S205; YES), the parameter i is incremented (step S206), and processes are similarly executed for the sub-image candidate with next priority.

When it is determined that there is no unprocessed sub-image candidate (step S205; NO), the sub-image selector 370 does not select the sub-image (step S207) since it may be determined that there is no sub-image that can be displayed, and the sub-image selection process is ended.

After finishing the sub-image selection process, a selection result is transmitted to the sub-image controller 380. The sub-image controller 380 determines whether or not the sub-image has been selected in the sub-image selection process (FIG. 5, step S105). In cases where the sub-image has not been selected (step S105; NO), the step S106 and step S107 are skipped since there is no sub-image to be displayed.

On the other hand, in cases where the sub-image has been selected (step S105; YES), the sub-image control unit 380 starts a sub-image displaying process (step S106).

The sub-image displaying process executed in the step S106 will be described with reference to FIG. 7. In the sub-image displaying process, first, the address according to which the program for displaying the selected sub-image is stored is acquired, with reference to the selected sub-image information. Then, the program on the position of the sub-image displaying program memory 3930 is read, and the program (sub-image displaying program) for displaying the sub-image is started (step S301).

By starting the sub-image display program, the sub-image can be acquired in order as a result of processing the program (step S302). The sub-image displaying program determines the size and shape of the sub-image based on the shape and size of the unused area.

The sub-image controller 380 acquires a sub-image display position calculated by the sub-image displaying program based on the size and shape of the sub-image, the size, shape and coordinates of the unused area (step S303).

Then, the sub-image controller 380 transmits the acquired sub-image and the sub-image display position to the corrector 330 in order, and starts a process that converts the sub-image and stores the result in the buffer 340 (step S304). The corrector 330 corrects the sub-image in order using the parameter that is used for the correction of the main image, and stores the corrected sub-image in the transmitted sub-image display position in the buffer 340. The substantially triangle area on which the sub-image is displayed is reserved as an area for displaying the sub-image, and is not treated as the unused area in subsequent processes until the reservation is reset.

When the step S304 finishes, the sub-image displaying process is completed and the process transfers to step S107 of FIG. 5. In the step S107, it is determined whether the number of sub-images currently displayed is less than the maximum display number stored in the setting memory 3910. When it is determined that the number is less than the maximum display number (step S107; YES), the process returns to step S104 in order to further display the sub-image using the current unused area.

In cases where the number of the sub-images currently displayed is equal to or more than the maximum display number (step S107; NO), the process transfers to step S108, based on an assumption that it is not necessary to display more sub-image.

In step S108, the unused area detector 360 determines whether the correction setting for the keystone correction is changed, and the shape and size of the unused area is changed. In cases where the correction setting is not changed (step S108; NO), then waits in the current state until a change of the correction setting is occurred.

On the other hand, in cases where the correction setting is changed (step S108; YES), the selected sub-image is reset, the process is returned to the step S104, and selection and displaying processes of the sub-image are executed again based on changed correction setting.

According to the projector control device 30 of the present embodiment, the sub-image can be displayed on the unused area at the time of performing the keystone correction. Therefore, the unused area generated by the keystone correction can be effectively utilized, whereas conventional projectors do not effectively use this area.

Moreover, since the priority is defined and the image with high priority is selected and displayed using the unused area among the sub-images that can be displayed, it is possible to preferentially display the sub-image for displaying the information desired by the user.

Conventionally, at the time of displaying the property and setting screen of a projector, these are displayed so as to overlap with the main image, therefore these images are displayed small so as to get out the way of displaying the main image. On the other hand, according to the projector control device 30 in the present embodiment, even if these images are displayed largely within a range where the images can be displayed, there would be no overlapping with the main image, and thereby these images would be no obstruction to the main image. Therefore, there is no necessity of making a sub-image small by force to display, and it is easy to see by the user.

Moreover, according to the projector control device 30 in the present embodiment, a constitution that detects the part where the image data is not stored on the storage area in the buffer 340 as the unused area allows an omission of the constitution that calculates the unused area from the correction parameter.

By the constitution that corrects the selected sub-image by the corrector 330 and displays the result, the projector control device 30 of the present embodiment can also perform the keystone correction on the sub-image and display the result. Therefore, the sub-image has no distortion on the screen.

Moreover, by the constitution that selects, in accordance with the shape and size of the unused area, the sub-image that has the highest priority while satisfying the minimum display area, corrects the selected sub-image by the corrector 330 and displays the result, it is possible to perform the keystone correction on the sub-image and display the result. Therefore, the sub-image has no distortion on the screen.

Embodiment 2

Figure 8A:
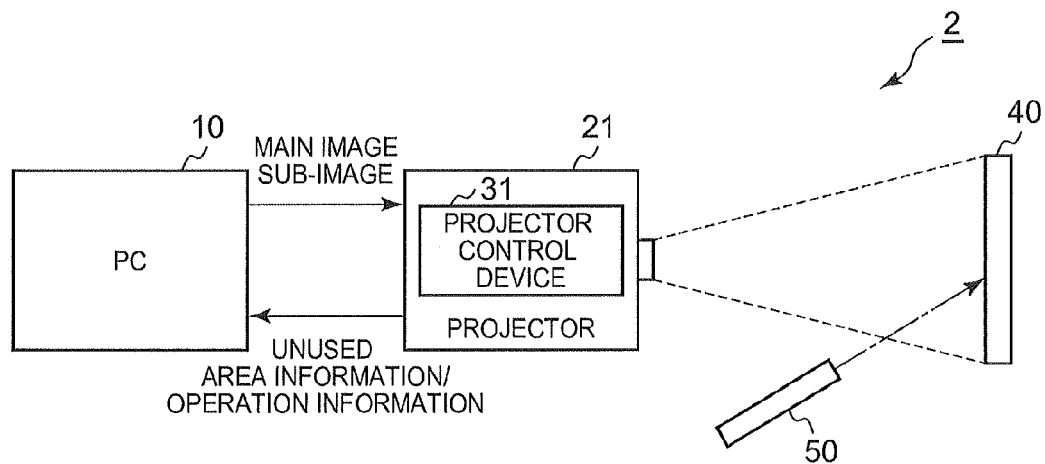
FIG. 8A is a block diagram illustrating a constitution of an image projection system according to embodiment 2 of the present invention.

Next, an image projection system 2 according to embodiment 2 of this application will be described with reference to FIG. 8. The image projection system 2, as illustrated in FIG. 8A, further includes a pointer device 50 that can realize a mouse operation using an image projected on the screen 40, in addition to the constitution of the image projection system 1 according to the embodiment 1. The projector 21 of the image projection system 2 transmits operation information that is operated by the user using the pointer device 50 and the information of the unused area to the PC 10. In addition to the main screen, the PC 10 further transmits a screen that serves as the sub-image candidate to the projector 21 based on the transmitted information.

The pointer device 50 points at a point on a projected image on the screen 40, and acquires the position information of the point. The pointer device 50 is provided with a button as well as a mouse, and transmits the operation received by the button, and the position information to the projector 21.

The means of acquiring the position information by the pointer device 50 may be a known arbitrary means for acquiring the position information. In this example, the pointer device 50 is provided with an infrared camera, photographs infrared gradation projected by the projector 21 at the predetermined intervals, and acquires the coordinates on the image from its intensity.

Figure 8B:
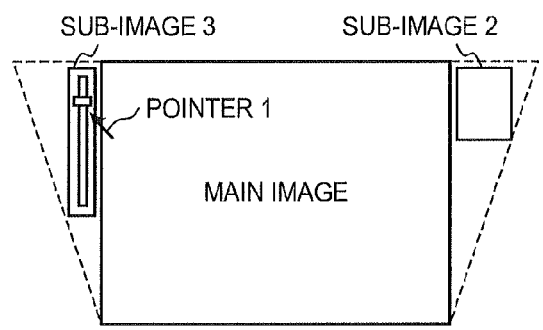
FIG. 8B is a drawing illustrating an example of the screen projected by the image projection system according to embodiment 2 of the present invention.

An example of the image projected on the screen 40 will be described with reference to FIG. 8B. In FIG. 8B, a pointer indicated by the pointer device 50 is located on the sub-image 3 for setting the projector (brightness setting). According to the image projection system 2 in the embodiment 2, it is possible to change the setting of the projector 21 by operating the setting screen as the sub-image 3 using the pointer device 50.

Figure 9:
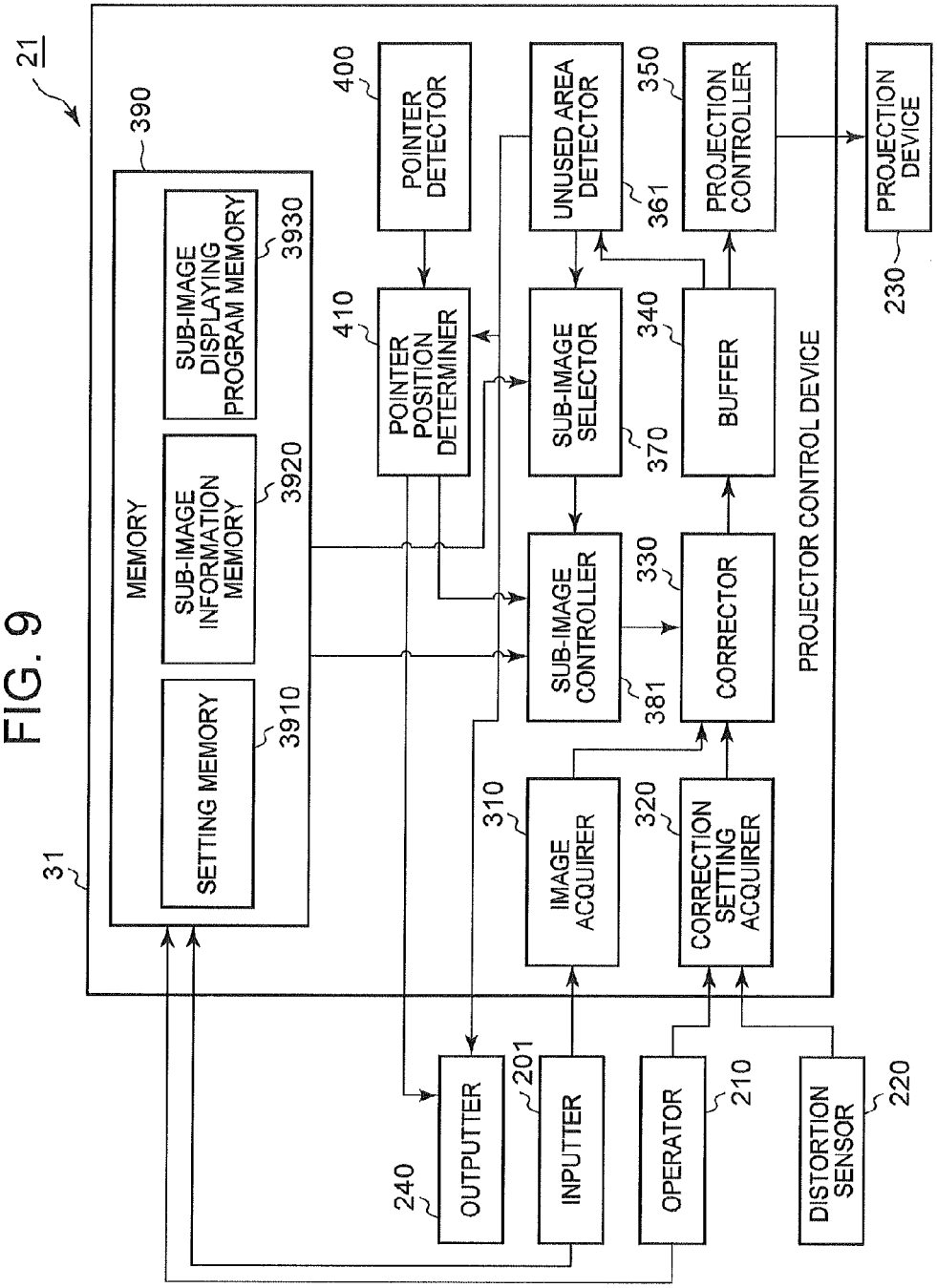
FIG. 9 is a block diagram illustrating constitutions of a projector and a projector control device according to embodiment 2.

Next, a constitution of the projector 21 will be described with reference to FIG. 9. The projector 21 is characterized in that: in comparison with the projector 20 in the embodiment 1, the projector 21 further includes an outputter 240; the inputter is an inputter 201 that receives information from the PC 10; the projector control device detects operation of the pointer device 50; and further, the projector 21 has a function of outputting the operation information of the pointer device 50 and the information of the unused area to the PC 10.

The projector control device 31 is characterized in that: in comparison with the projector control device 30 in the embodiment 1, the projector control device 31 further includes a pointer detector 400 and a pointer position determiner 410; and the functions of the unused area detector 361 and the sub-image controller 381 are different from the functions of corresponding parts of the projector control device.

The inputter 201 is characterized by having a function to receive the information on the sub-image that is output by the PC 10, in addition to the function of the inputter 200 in the embodiment 1.

The outputter 240 is an information transmitting device that is provided with a LAN (Local Area Network) interface, a USB (Universal Serial Bus) interface or the like. Note that the outputter 240 may be implemented by an information transceiver constituted by a common physical constitution with the inputter 201.

The outputter 240 transmits, to the PC 10, the information transmitted from the unused area detector 361, the pointer position determiner 410 and so on, under a control of the projector control device 31.

The PC 10 determines the image (sub-image candidate) to be displayed on the unused area and its priority, based on the transmitted information of the unused area, and transmits them to the inputter 201.

The inputter 201 registers received sub-image candidate and priority into the sub-image information in the sub-image information memory 3920.

In addition to the function of the unused area detector 360 in the embodiment 1, the unused area detector 361 has function of transmitting the information of the detected unused area to the outputter 240 to cause the outputter to transmit the information to the PC 10. The unused area detector 361 further acquires area information representing the part that the main image covers, the part that the sub-image covers, and the unused area, each on the buffer 340, and transmits the area information to the pointer position determiner 410.

The pointer detector 400 communicates with the pointer device 50, and acquires the position information of the pointer on the screen and the information representing a user's operation (operation such as a right-click, a left-click and so on) applied to the pointer device 50.

The pointer position determiner 410 compares the position information acquired by the pointer detector 400 with the area information transmitted from the unused area detector 361, and determines whether or not the pointer indicated by the pointer device 50 is on the main screen.

When it is determined that the pointer is on the main screen, it can be presumed that the user's operation is the operation to the screen of the PC 10. Therefore, the pointer position determiner 410 modifies current position information of the pointer and the operation information taking the correction performed by the corrector 330 into consideration, and further transmits the modified information to the PC 10 using the outputter 240. Specifically, the pointer position determiner 410 converts the position coordinate of the pointer in accordance with the correction parameter of the corrector 330, and interfaces with the position coordinate on the main image, and transmits the result to the PC 10. The PC 10 transmits, to the application during execution, received position information of the pointer and the operation information as operation information received by the mouse.

On the other hand, when it is determined that the pointer is on the sub-image or on the unused area, the current position information of the pointer and the operation information are transmitted to the sub-image controller 381, under a presumption that the user does not operate the PC 10.

The sub-image controller 381 is characterized by, in addition to the function of the sub-image controller 380 in the embodiment 1, having a function of changing the executing content of corresponding sub-image execution program, using the position information of the pointer on the unused area and the sub area, and the operation information, which are transmitted from the pointer position determiner 410.

In cases where the pointer is on the sub-image, the sub-image controller 381 modifies the position information and the operation information taking the correction performed by the corrector 330 into account, and transmits the result to a circuit executing the sub-image displaying program. That is, the position of the pointer is converted with the correction parameter of the corrector 330, and is interfaced with the position coordinate on the sub-image, and after that, the result is transmitted to the sub-image displaying program. For example, a case is assumed that the sub-image is a setting operation screen of the projector, and the pointer is on the sub-image. The sub-image displaying program for setting screen operation processes the operation by the pointer device 50 as setting operation using a mouse, and updates the setting information of the setting memory 3910 based on setting input from the user by the operation.

In cases where the pointer is not on the main image, the projector control device 31 can execute arbitrary process based on the operation information transmitted from the pointer device 50. For example, in cases where a predetermined motion of the pointer is present on the unused area, some processes may be performed such that the motion is detected as a mouse gesture and a predetermined sub-image is read.

An example of the sub-image information stored in the sub-image information memory 3920 in the embodiment 2 will be described with reference to FIG. 10. In addition to the sub-image candidate registered in the example (FIG. 3) of the sub-image information in the embodiment 1, a PC designating screen (sub-image ID=5) and a brightness setting screen (sub-image ID=6) are registered in the sub-image information in FIG. 10.

The PC designating screen (ID=5) is the sub-image generated by the PC 10 based on the size of the unused area, and is acquired by the inputter 201 to store in the memory 390. The execution program (#05) of the PC designating screen is a program for reproducing the sub-image acquired from the PC 10, the program being stored in the sub-image displaying program memory 3930. The priority (1) of the PC designating screen is a priority of the PC designating screen defined by the PC 10 and transmitted to the inputter 201. The PC 10 designating screen may be, for example, an image for displaying data that the PC 10 holds, such as a page number of presentation materials and a file name.

The brightness setting screen is a screen (sub-image 3 of FIG. 8B) for operating the setting of the brightness that represents an intensity of the light that the projection controller 350 controls the projection device 230 to output, the screen being stored in the setting memory 3910. The execution program (#06) of the brightness setting screen is a program for displaying a slide bar or the like to change the setting value of brightness, and sets a new brightness based on a relative position of the pointer on the sub-image 3, and the operation information on the pointer 50.

According to the image projection system 2 in the embodiment 2, the user can use the main image as a desktop of the PC 10 and use the unused area and the sub-image as a setting screen for operating the projector.

Moreover, the PC 10 can communicate with the projector 21 and designates the content to be displayed as the sub-image, therefore the user can designate a desired sub-image flexibly. Accordingly, the unused area can be used more effectively.

Figure 11:
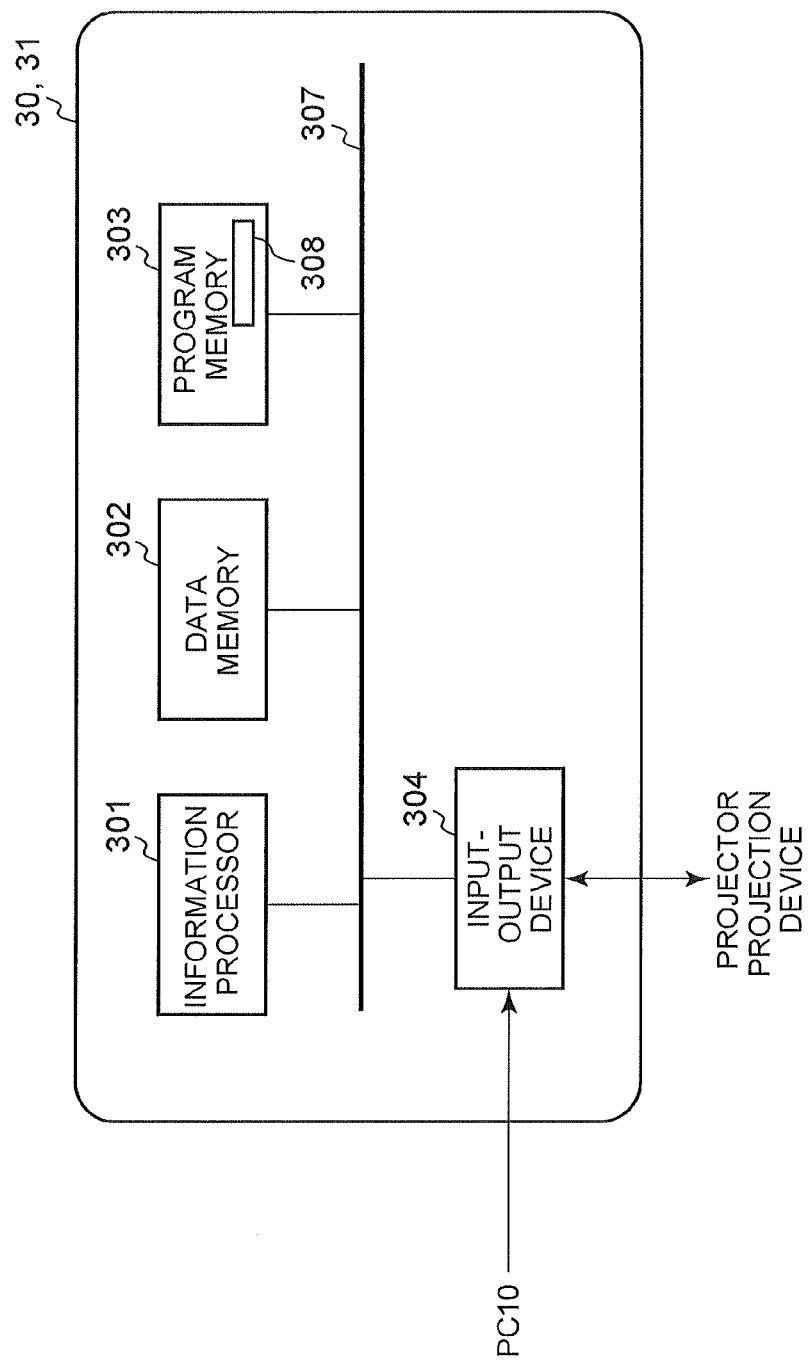
FIG. 11 is a drawing illustrating a physical constitution of the projector control device according to embodiments of the present invention.

Next, hardware structures of the projector control device 30 according to the embodiment 1 and the projector control device 31 according to the embodiment 2 will be described with reference to FIG. 11.

The projector control device 30 and the projector control device 31 are provided with an information processor 301, a data memory 302, a program memory 303, an input-output device 304, and an internal path 307.

The information processor 301 is provided with a CPU (Central Processing Unit), a DSP (Digital Signal Processing) or the like, and performs various kinds of processes of the image projection process including the image correction process, in accordance with the control program 308 stored in the program memory 303.

The data memory 302 is provided with a RAM (Random-Access Memory) or the like, and is used as a workspace of the information processor 301.

The program memory 303 is provided with a nonvolatile memory such as a flash memory and a hard disk, and stores the control program 308 that controls the operation of the information processor 301. Moreover, the program memory 303 stores the sub-image displaying program stored in the sub-image displaying program memory 3930.

The information processor 301, the data memory 302, the program memory 303, and the input-output device 304 are connected each other through the internal path 307, and it is possible to transmit the information therethrough.

The input-output device 304 is an I/O unit that controls an input and an output of the information with an external apparatus.

The input-output device 304 acquires data input from the inputter 200 (inputter 201) of the projector 20 or the projector 21, the operator 210, the distortion sensor 220 and the like, and transmits the data to the information processor 301. Moreover, the input-output device 304 outputs the calculation result of the information processor 301 to the outputter 240 and the projection device 230 and so on.

(Modification)

The present invention is not limited to the above-described embodiments, but various modification can be made.

For example, although the distortion sensor 220 is an accelerometer that measures a slope of the projector in the embodiment 1 and 2, implementation means of the distortion sensor is not limited to this example. The distortion sensor may include a camera that photographs a shape of the image projected onto the screen 40, and an apparatus that measures a degree of distortion of the image on the screen from a shape of the image photographed by the camera. In this case, the distortion sensor transmits a distortion acquired by photography to the projector control device 30 as information distortion.

Moreover, although it is mainly described, in the embodiments 1 and 2, the case where information such as the display of the current time, the image input terminal and the like is displayed as the sub-image, the sub-image may be an image for displaying other various kinds of information. For example, the projector control device 30 (the projector control device 31) may store the image projected as the main image before as a history, and may display the stored previous main image as the sub-image after the main image changes. In this case, the projector control device further includes a main image history memory that stores the image projected as the main image, and a change determiner that determines whether or not the main image changes. Note that the main image history memory may store only one last screen.

According to such constitution, it is possible to compare the previous main image and the current main image, and in particular, there is an advantage that a viewer can easily compare the relevance and the difference between earlier screen and later screen in a slide show or the like.

In the embodiments 1 and 2, the unused area detector 360 (the unused area detector 361) detected the shape of the unused area of the buffer 340 as vertices of substantially triangular. The detection means of the unused area is not limited to this example, but the unused area detector may detect the unused area by arbitrary known means. For example, a matrix (an area matrix, size N×M), the size of which corresponds to the size of the buffer 340, is generated, and the values of the area matrix are defined to any of a flag that corresponds to the unused area (for example, −1), a flag that corresponds to the main image (for example, 0), and a flag that corresponds to the sub-image (for example, number of the sub-image such as +1, +2, and so on). In such matrix, the part of the value −1 may be defined as the unused area.

Alternatively, the unused area detector may detect the unused area based on the correction setting acquired by the correction setting acquirer. In this case, the unused area detector acquires the correction parameter from the correction setting acquirer, and detects the unused area with reference to a list in which a correspondence between the correction parameter stored in the memory 390 and the unused area is stored.

The process of determining whether the sub-image candidate can be displayed on the unused area is not limited to the above-described embodiments. Arbitrary process can be applied as this process, in which it is determined that whether or not the data of arbitrary two-dimensional shape can be arranged on the unused area of a two-dimensional buffer. For example, in cases where the unused area is detected using the above-described area matrix, a determination process as illustrated in FIG. 12 is available.

Figure 12A:
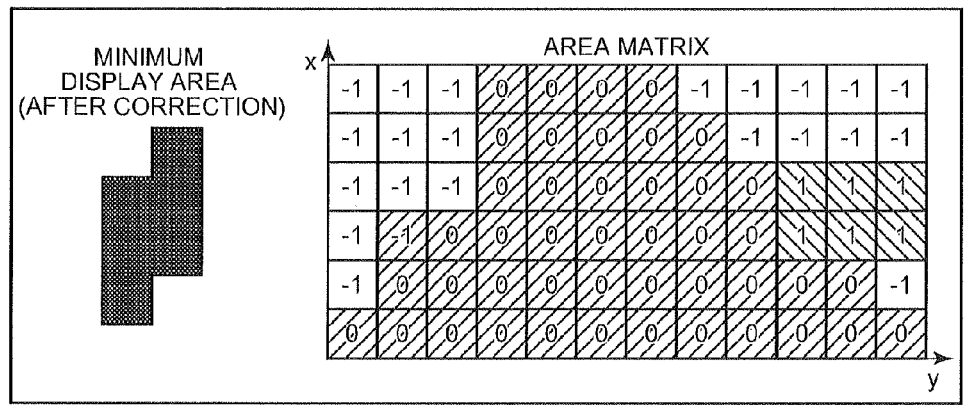
FIG. 12A is a drawing illustrating a sub-image selection process according to other embodiments of the present invention.
Figure 12B:
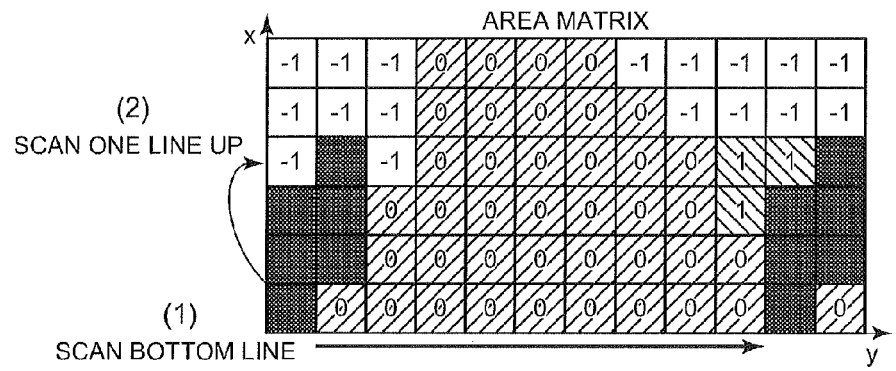
FIG. 12B is a drawing illustrating a sub-image selection process according to other embodiments of the present invention.
Figure 12C:
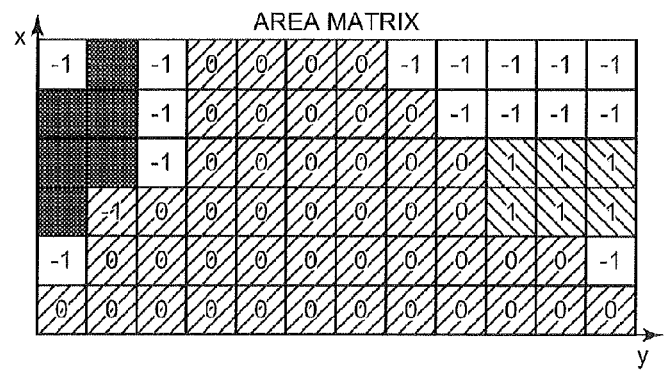
FIG. 12C is a drawing illustrating a sub-image selection process according to other embodiments of the present invention.

In the process of FIG. 12, the sub-image information memory 3920 previously stores the information that defines minimum required area for displaying the sub-image. At the time of the determination, the above-mentioned minimum display area is corrected in accordance with the same correction parameter for the main image (left side in FIG. 12A). Then, the minimum display area after the correction is applied on the area matrix, and it is determined whether the above-mentioned minimum display area can be defined without overlapping with any areas other than the unused area. In the determination, the minimum display area after the correction are overlapped on the area matrix, and it is determined whether the minimum display area is overlapped with the main area that is represented by the slash line and the sub-image display area that is represented by vertical and horizontal lines in FIG. 12. In cases where these are overlapped, it is determined whether there is any place where these can be arranged without overlapping while shifting the minimum display area horizontally one by one (FIG. 12B). Then, when the process for one column is finished, object of the process is shifted by one in a vertical direction, and the process for next line is performed. In this manner, if there is the part in which the minimum display area can be defined using only the unused area, somewhere in the area matrix (FIG. 12C), it is determined that the sub-image can be displayed. Then, the sub-image controller displays the sub-image onto any of the positions on the area matrix on which an image can be displayed.

Moreover, in the embodiment 1 and the embodiment 2, the area on which the sub-image is displayed does not treated as the unused area, and it is processed so that sub-images does not overlap each other, but as a modification of the present invention, the sub-image display area is determined as an unused area at the time of displaying the next sub-image, and the sub-images may overlap each other. In this case, the sub-image with a higher priority is displayed on upper layer.

Moreover, in the above-mentioned process, the sub-image is displayed so that it does not overlap with the main image, but as another modification of the present invention, it is possible to define the unused area and a predetermined area on the main image as the part on which the sub-image can be displayed. In this case, the information that designates the unimportant position on the main image is received from the PC 10, and the unused area detector detects the area as the unused area. According to such constitution, it is possible to display the sub-image not only on the part that is not displayed due to the keystone correction but also on the unimportant part on the main image, therefore the area on which the sub-image is displayed can be enlarged.

Moreover, although the right and left unused areas are processed as separated areas, respectively, in the above-mentioned embodiments, in a modification of the present invention, a constitution can be made in which a plurality of unused areas are integrated into one area, and one sub-image is displayed over the plurality of unused areas. In this case, the sub-image controller generates virtual memory space that links the plurality of unused areas detected by the unused area detector, considers the memory space as one unused area to display the sub-image thereon, and the sub-image is divided and stored on the buffer 340.

Moreover, in the embodiment 1 and the embodiment 2, the sub-image is corrected as the main image and projected, but a process that does not convert the sub-image can be applied. According to such constitution, it is possible to reduce calculation amount required for an image projection process.

Furthermore, the embodiment 1 and the embodiment 2 describes the case where the keystone correction is performed in a perpendicular direction, but the present invention is not limited to this means and it can be applied to a case where the keystone correction is performed in horizontal direction, and a case where the keystone correction is performed in both of vertical and horizontal directions.

In addition, the hardware structures and the flowcharts described above are only examples, and modification and correction can be made arbitrarily.

The main parts for performing the control process that includes the information processor 301, the data memory 302, the program memory 303, the input-output device 304, and the internal paths 307 and so on can be achieved using a dedicated hardware or a general computer system. It is possible to constitute the projector control device 30 (the projector control device 31) that executes the above-described processes, for example, by recording a computer program for executing above-described operation into a computer-readable recording medium (such as a flexible disk, CD-ROM, DVD-ROM) to distribute the recording medium, installing the computer program in a computer, and further connecting to the projection device with a projection function. Alternatively, it is possible to constitute the projector control device 30 (the projector control device 31) by storing in advance the computer program in a storage device included in a server apparatus on the communication network such as Internet, and downloading the program by a normal computer system.

In cases where OS (operating system) and an application program shares and realizes the functions of the projector control device 30 (projector control device 31) or in cases where the OS and the application program realizes the functions in cooperation, only the application program may be stored in a recording medium or a storage device.

Moreover, it is also possible to superimpose the computer program on a carrier wave and to distribute through a communication network. For example, the computer program may be places on the bulletin board system (BBS) on the communication network, and may be distributed through the network. The system may be constituted so that the above-described processes can be executed, by activating this computer program and executing the program as well as other application programs under a control of OS.

Although the preferable embodiments of the present invention are described, the present invention is not limited to the specific embodiments, and covers invention specified in the claims and equivalent thereof.

Having described and illustrated the principles of this application by reference to one or more preferred embodiments, it should be apparent that the preferred embodiment(s) may be modified in arrangement and detail without departing from the principles disclosed herein and that it is intended that the application be construed as including all such modifications and variations insofar as they come within the spirit and scope of the subject matter disclosed herein.

What is claimed is:

1. A projector control device comprising:
   a projection controller that performs a keystone correction on a main image that is a major image projected and displayed on a projection plane, and causes a projection device to project a corrected main image;
   a detector that detects an unused area to which the projection device can project an image and that is an area not displaying the main image to which the keystone correction is applied; and
   a sub-image acquirer that acquires a sub-image to be displayed on at least a part of the unused area detected by the detector,
   wherein the projection controller controls the projection device to project the sub-image to at least the part of the unused area.

2. The projector control device according to claim 1, further comprising:
   a buffer that includes a storage area corresponding to the area to which the projection device projects the image, and stores an image to be projected by the projection device; and
   a corrector that corrects a distortion of the image,
   wherein
   the projection controller, by causing the corrector to correct the main image and storing the corrected main image in the buffer, performs the keystone correction on the main image and causes the projection device to project the corrected main image,
   wherein the detector detects an area that is a part of the storage area of the buffer and does not store the main image, as the unused area, and
   wherein the sub-image acquirer causes at least a part of the unused area of the buffer to store an acquired sub-image.

3. The projector control device according to claim 2, wherein the sub-image acquirer corrects the acquired sub-image with a parameter with which the corrector has corrected the main image, and stores the corrected sub-image in the buffer.

4. The projector control device according to claim 1, wherein the sub-image acquirer selectively acquires the sub-image from a plurality of sub-image candidates, based on at least one of a size and a shape of the unused area detected by the detector.

5. The projector control device according to claim 2, wherein the sub-image acquirer selectively acquires the sub-image from a plurality of sub-image candidates, based on at least one of a size and a shape of the unused area detected by the detector.

6. The projector control device according to claim 3, wherein the sub-image acquirer selectively acquires the sub-image from a plurality of sub-image candidates, based on at least one of a size and a shape of the unused area detected by the detector.

7. The projector control device according to claim 1, further comprising:
   a position acquirer that acquires a pointer position indicated by a pointer device on a screen projected by the projection device;

a position determiner that determines whether or not the pointer position acquired by the position acquirer is on the main image; and a transmitter that transmits the pointer position to an external apparatus when the position determiner determines that the pointer position is on the main image.

8. The projector control device according to claim 7, wherein, when the position determiner determines that the pointer position is not on the main image, and the pointer position is on the sub-image, the projector control device changes the sub-image based on at least one of the pointer position and operation information acquired from the pointer apparatus.

9. The projector control device according to claim 8, wherein the sub-image is a setting screen for a setting operation of the projector, wherein the projector control device further comprises a setting information memory that stores a setting information of the projector updated based on at least one of the pointer position and the operation information acquired from the pointer device, when it is determined that the pointer position is on the sub-image.

10. A non-transitory computer-readable medium recording a program, wherein the program includes a series of commands that causes a computer to execute functions including:

a process that performs a keystone correction on a main image that is a major image displayed at the time of projecting and displaying an image on a projection plane, and causes a projection device to project a corrected main image;

a detection process that detects an unused area to which the projection device can project an image and that is an area not displaying the main image to which the keystone correction is applied;

a process that acquires a sub-image to be displayed on at least a part of the unused area detected by the detection process; and a process that causes the projection device to project the sub-image to at least a part of the unused area.

* * * * *